A. A. CULBERTSON.
RESILIENT TIRE.
APPLICATION FILED OCT. 22, 1918.

1,343,766.

Patented June 15, 1920.

Witnesses
Guy M. Spring
Wm H. Mulligan

Inventor
Alonzo A. Culbertson
By Richard B. Owen
Attorney

UNITED STATES PATENT OFFICE.

ALONZO A. CULBERTSON, OF TOPEKA, KANSAS.

RESILIENT TIRE.

1,343,766.     Specification of Letters Patent.     Patented June 15, 1920.

Application filed October 22, 1918. Serial No. 259,221.

*To all whom it may concern:*

Be it known that I, ALONZO A. CULBERTSON, a citizen of the United States, residing at Topeka, in the county of Shawnee and State of Kansas, have invented certain new and useful Improvements in Resilient Tires, of which the following is a specification.

This invention relates to resilient tires and more particularly to an improved spring tire employing the usual outer casing and an inner resilient spring member, the latter to take the place of the ordinary pneumatic tube now in use whereby no air is necessary in the tire while the same will possess the desired resiliency.

One of the principal objects of the invention is to provide an improved construction of coil spring adapted to be inserted in the tire casing and extended completely around on the interior thereof, the spring comprising an improved construction designed to give sufficient spring action and to readily absorb shock.

A further object of the invention is the provision of a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, wherein:—

Figure 1:
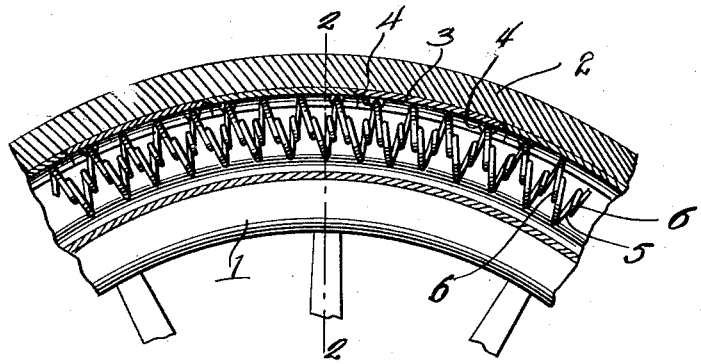
Figure 1 is a longitudinal section through a fragmentary portion of the device constructed in accordance with my invention.
Figure 2:
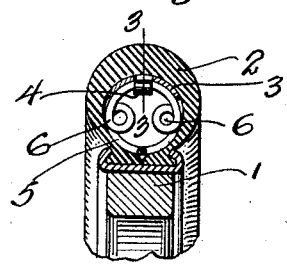
Fig. 2 is a section taken on the line 2—2 of Fig. 1.

Referring to the drawings, wherein is illustrated the preferred form of my invention, in which like characters of reference indicate like or corresponding parts throughout the several views, the wheel felly 1 is constructed in the usual manner and has the tire casing 2 mounted thereon in the same manner as is done when the pneumatic tube is employed. A plurality of plates 3 are employed to form a shield within the casing and each plate consists of a transversely arched plate of a predetermined length, the same being also longitudinally curved to fit the curve of the tire casing 2. These plates 3 may be of any desired length and are adapted to have their adjacent ends overlapped as shown to advantage in Figs. 1 and 3 of the drawings, the overlapping being accomplished by beveling the end edges of the plates and fitting them together as shown so that longitudinal movement is permitted. The plates may be readily fitted together and received in the tire casing, thereby forming a shield in the casing to prevent undue wear by the spring members when the device is in use.

Figure 3:
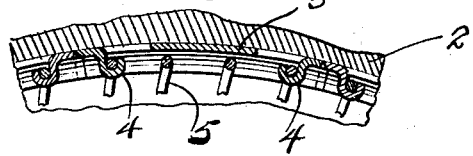
Fig. 3 is a fragmentary longitudinal section taken on the line 3—3 of Fig. 2.
Figure 4:
Fig. 4 is a fragmentary plan view of a portion of the inner structure adapted for mounting in the tire casing.

Each plate, as shown to advantage in Figs. 3 and 4 is provided with a pair of clips 4, these clips being formed by inwardly pressed portions of the plate at the ends thereof, the inwardly pressed portions being then bent to form hooks which depend into the space normally occupied by the pneumatic tube in the pneumatic tire of the common type. As evident by the drawing, each plate is provided with at least two of such clips 4; one adjacent to each beveled edge of the plate and facing inwardly toward each other so that the hooked end of each clip grips and supports a convolution of the spring member inwardly of the beveled edge.

Arranged within the casing and extending completely around the same is a coil spring 5 which consists of the usual convolutions of a diameter large enough to fit within the casing and bear against the shield formed by the plates 3. Certain of the large convolutions are hooked over the hook ends of the clips 4 and this may be done previous to the insertion of the device in the tire casing, so that subsequent to passing the convolutions through the spaces between the said hooked ends and the bodies of the plates the spaces may be reduced to prevent displacement of the convolutions. The openings in the plates would ordinarily be sufficient to permit a tool to be inserted therethrough for the purpose of forcing the hooked ends of the clips toward the bodies of the plates and thus reducing the space as required. Each convolution, however, is coiled at diametrically opposite points to provide the relatively small convolutions 6 which act as auxiliary spring members and assist the large convolutions in giving the desired resiliency to the tire. Inasmuch as the plates are separably connected to the spring 5 and must necessarily move with the expansion and contraction of the spring and casing, it is obvious that the beveled edges permit the plates to move longitudinally of one another and it is further to be noted in this connection that the longitudinal movement of a plate during the contraction or expansion of the coiled spring is limited by the abutment of one of the hooks with the beveled edge of an adjacent plate. It is believed that such displacement would however, be ordinarily of slight degree and that the casing itself would, at all events, prevent any improper displacement of the plates, during compression of the tire. The large convolutions, will of course, have an inherent resiliency and will thereby absorb a greater portion of the shock as the wheel is in motion. The smaller convolutions, however, tending to lessen the rigidity of the larger convolutions, will act as auxiliary springs to absorb the minor shock, so that added resiliency will be thereby obtained and the tire will readily respond to the unevenness of the roadway so that all the advantages of the pneumatic tire will be obtained.

The foregoing description and accompanying drawings have reference to what might be considered to be the preferred or approved form of my invention. I desire it to be understood that I may make such changes in the construction and combination and arrangement of parts, materials dimensions et cetera, as may prove expedient and fall within the scope of the appended claim.

Having thus fully described my invention, what I claim as new and desire to secure by Letters Patent, is:—

A spring tire comprising an outer casing, an endless coil spring arranged in said casing, and a sectional shield disposed within the casing and between the latter and the endless coil spring, each section of said shield comprising a plate beveled at its forward and rear edges and mounted upon said spring with its rear beveled edge overlapped by the forward beveled edge of the succeeding plate, each plate having portions struck inwardly therefrom and bent to provide hooks one adjacent to and facing inwardly from each of said beveled edges, and engaging a coil of said spring for securing said plate thereto, the hooks adapted by their abutment with the beveled edges of adjacent plates to limit longitudinal movement of the plates during the contraction or expansion of the coiled spring.

In testimony whereof I affix my signature in presence of two witnesses.

ALONZO A. CULBERTSON.

Witnesses:
WM. P. WILSON,
HARRIETT McFARLAND.